(12) United States Patent
Arlitt et al.

(10) Patent No.: US 6,272,598 B1
(45) Date of Patent: Aug. 7, 2001

(54) WEB CACHE PERFORMANCE BY APPLYING DIFFERENT REPLACEMENT POLICIES TO THE WEB CACHE

(75) Inventors: Martin F. Arlitt, Palo Alto; Richard J. Friedrich, San Jose; Tai Y. Jin, San Mateo, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/273,849

(22) Filed: Mar. 22, 1999

(51) Int. Cl.[7] .................................................. G06F 12/08
(52) U.S. Cl. .......................... 711/133; 711/129; 711/134; 711/136; 709/203; 709/219
(58) Field of Search ..................................... 711/122, 133, 711/134, 135, 136, 129, 173; 709/203, 219

(56) References Cited

U.S. PATENT DOCUMENTS

| | | | |
|---|---|---|---|
| 4,458,310 | * 7/1984 | Chang | 711/119 |
| 5,623,627 | * 4/1997 | Witt | 711/122 |
| 5,787,471 | * 7/1998 | Inoue et al. | 711/133 |
| 5,787,472 | * 7/1998 | Dan et al. | 711/134 |
| 5,937,429 | * 8/1999 | Kumar et al. | 711/133 |
| 6,012,126 | * 1/2000 | Aggarwal et al. | 711/133 |
| 6,032,227 | * 2/2000 | Shaheen et al. | 711/129 |
| 6,088,767 | * 7/2000 | Dan et al. | 711/129 |

* cited by examiner

*Primary Examiner*—Hiep T. Nguyen
(74) *Attorney, Agent, or Firm*—Thomas X. Li (57) ABSTRACT

A cache system is described that includes a storage that is partitioned into a plurality of storage areas, each for storing one kind of objects received from remote sites and to be directed to target devices. The cache system further includes a cache manager coupled to the storage to cause objects to be stored in the corresponding storage areas of the storage. The cache manager causes cached objects in each of the storage areas to be replaced in accordance with one of a plurality of replacement policies, each being optimized for one kind of objects.

21 Claims, 5 Drawing Sheets

WEB CACHE PERFORMANCE BY APPLYING DIFFERENT REPLACEMENT POLICIES TO THE WEB CACHE

BACKGROUND OF THE INVENTION

1. Field of the Invention

The present invention pertains to data access network systems (e.g., Internet/Intranet systems). More particularly, this invention relates to partitioning a cache such that different cache replacement policies are employed for different storage areas of the cache that store different kinds of objects to improve performance of the cache.

2. Description of the Related Art

As is known, access to Web documents via the Internet is generally structured around the Hyper Text Transfer Protocol (HTTP). The HTTP protocol is a request-and-response protocol. When a user at a client device (e.g., a personal computer) designates a particular Web page, at least one request is generated. The number of requests is dependent upon the sophistication of the designated Web page. Often, a Web page is formed from a number of data files, such as text files, graphics files, audio files, and video files. Each of the files is referred to as an "object". A multi-object page is aesthetically pleasing, but each object requires a separate request and a separate response. Therefore, the time for each request-and-response round trip plays a role in determining the total time a user must wait to view the complete Web page.

The total latency in downloading a Web page or other Internet document (e.g., a FTP file) depends on a number of factors, including the transmission speeds of communication links between a client device and a server on which the requested file is stored (i.e., content server), delays that are incurred at the server in accessing the document, and delays incurred at any intermediate device located between the client device and the content server. The intermediate devices may include proxy servers and routers that are between the client devices and the content server that stores the Web page file. An important benefit of a Web proxy server is the ability to cache objects received from the remote content servers. This allows the cached objects to be quickly retrieved and sent to the client devices if they are again requested. As is known, some of the cached objects may be requested by the same or different client device at later times. The caching operation of the Web proxy server will be described below, with reference to FIG. 1.

Figure 1:
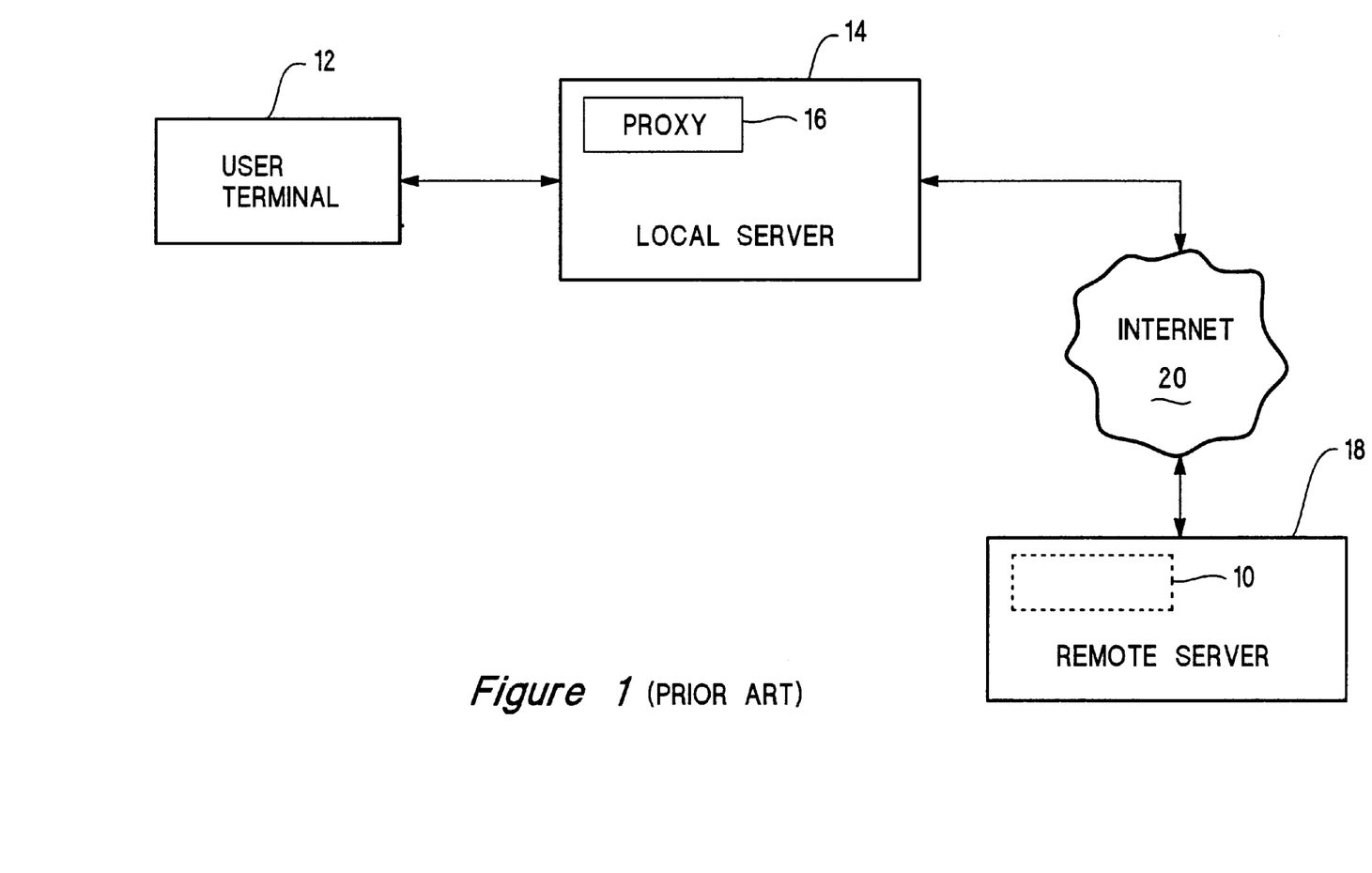
FIG. 1 shows a prior art Internet/Intranet system that uses a proxy server to provide objects, such as Web documents, to client devices.

As can be seen from FIG. 1, when a client device or user terminal 12 generates a request for a particular object (e.g., the object 10 stored in the remote server 18), the cache of the proxy server 16 in the local server 14 is searched to determine whether the object 10 is stored at the proxy server 16. If the object is not found in the cache of the proxy server 16, a "cache miss" results and the local server 14 directs the request to the remote server 18 via the Internet 20. As can be seen from FIG. 1, the remote server 18 stores the requested object 10. Once the remote server 18 receives the request, it directs a response with the requested object 10 to the client device 12 via the local server 14. During this process, the requested object 10 is also cached in the proxy server 16 of the local server 14. This eliminates the need for the local server 14 to send another request to the remote server 18 for the same object 10 at a later time when either the same client device 12 or a different client device (not shown) requests for the same object 10. When the object 10 is again requested, the proxy server 16 is accessed and a "cache hit" results. In this case, the cached object 10 is quickly forwarded to the client device directly from the proxy server 16. This eliminates delays encountered in communicating between the proxy server 16 and the remote server 18. By storing copies of objects received from remote sites, the proxy server 16 reduces the number of requests that are directed to the remote server 18, as well as the traffic on the Internet 20 as a result of transmitting the responses in the form of a number of packets that must be reassembled at the client device 12.

Ideally, the cache at the proxy server 16 retains all of the cached objects. However, the typical storage capacity of the proxy server 16 is in the range of 256 megabytes to 1 terabyte, with most Web proxy capacity being at the lower half of the range. Therefore, it is important to form a replacement strategy or policy for determining which objects are to be evicted or replaced from the cache of the proxy server 16 when a recently received object is to be cached within exhausted storage space. Two important metrics that are used to measure proxy cache performance are cache hit rate and byte hit rate. The cache hit rate is the percentage of all user requests that are satisfied by the proxy server 16, rather than by access to the original server 18. The byte hit rate is the percentage of all network traffic, measured in bytes, transferred directly from the proxy server 16, instead of across the external network.

There are a number of cache replacement strategies or policies that have been proposed for Web proxy caching. However, the cache in the prior art proxy server typically uses only one replacement policy to manage the content of the cache. As is known, each replacement policy has its advantages and disadvantages, and is suitable for one kind of objects. This means that each of the replacement policies improves the performance of the cache in the proxy server for a chosen metric (e.g., hit rate, byte hit rate, or latency). For example, a replacement policy of evicting the largest document (rather than a number of smaller documents) may improve cache hit rate, but does not improve the byte hit rate. As a further example, a replacement policy of evicting the smallest document may increase the byte hit rate, but does not improve the cache hit rate.

SUMMARY OF THE INVENTION

One feature of the present invention is to increase the performance of a cache system.

Another feature of the present invention is to increase the performance of a cache system by allowing multiple replacement policies to be applied to the cache system.

A further feature of the present invention is to increase the performance of a cache system by partitioning the cache system into a number of storage areas, each for storing one kind of objects, such that multiple cache replacement policies, each optimized for one kind of objects, can be applied to the cache system.

A cache system includes storage that is partitioned into a plurality of storage areas, each for storing one kind of objects received from remote sites and to be directed to target devices. The cache system further includes a cache manager coupled to the storage to cause objects to be stored in the corresponding areas of the storage. The cache manager causes cached objects in each of the storage areas to be replaced in accordance with one of a plurality of replacement policies, each being optimized for one kind of objects.

A cache system includes storage that either includes a first and a second storage device coupled together, or is partitioned into the first and second storage devices. Each of the storage devices stores objects received from the remote sites and to be directed to the target devices. The cache system also includes a cache manager coupled to the first storage device to send received objects to the first storage device. The cache manager causes cached objects in the first storage device to be replaced in accordance with a first replacement policy. The replaced objects are then sent to the second storage device. The cache manager causes objects stored in the second storage device to be replaced in accordance with a second replacement policy different from the first replacement policy.

Other features and advantages of the present invention will become apparent from the following detailed description, taken in conjunction with the accompanying drawings, illustrating by way of example the principles of the invention.

DETAILED DESCRIPTION OF THE INVENTION

Figure 2:
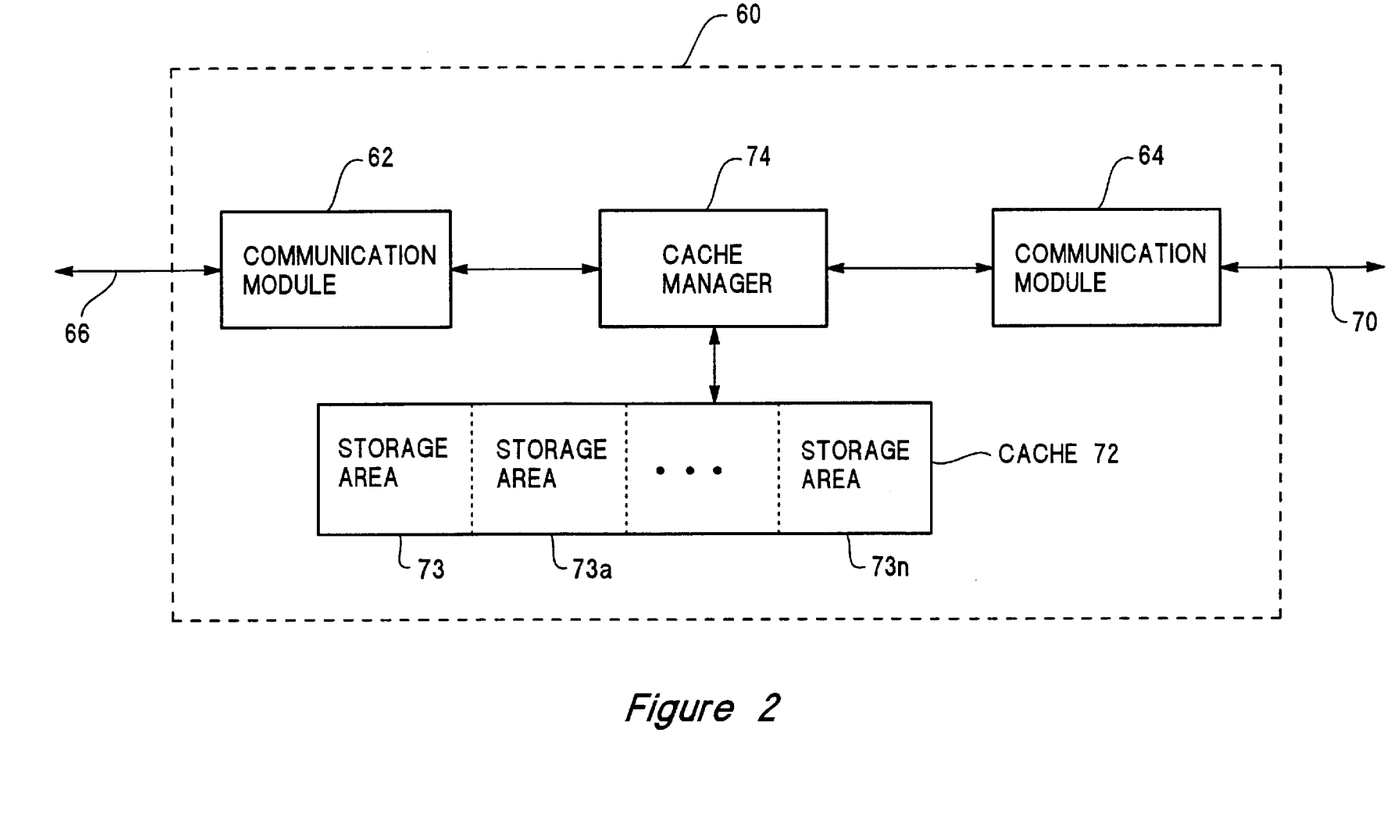
FIG. 2 shows the structure of a proxy in accordance with one embodiment of the present invention.

FIG. 2 shows the structure or configuration of a proxy 60 that implements one embodiment of the present invention. The proxy 60 can be used as a proxy server in an Internet/Intranet system for caching objects received from a remote site to a client device connected to the proxy server. In addition, the proxy 60 may also be used in other applications, such as in CPU or other cache management, garbage collection, etc. Thus, the proxy 60 may also be referred to as a cache system or proxy server.

As will be described in more detail below, the proxy 60 includes a cache 72 and a cache manager 74. In accordance with one embodiment of the present invention, the cache 72 is logically partitioned into a plurality of storage areas 73 through 73n. Each of the storage areas 73–73n is used to store one kind of objects. For example, the storage area 73 is used to store objects of small size while the storage area 73a is used to store objects of large size. The storage area 73n may be, for example, used to store very popular objects.

The cache manager 74 is coupled to the cache 72 to cause objects to be stored in the corresponding storage area of the cache 72. The cache manager 74 also causes the cached objects in each of the storage areas 73–73n to be replaced in accordance with one of a number of replacement policies, each being optimized for one kind of objects. The proxy 60 will be described in more detail below, also in conjunction with FIGS. 2 and 3.

As can be seen from FIG. 2, the proxy 60 includes a client-side communication module 62 and a network-side communication module 64. The client-side communication module 62 is used to interface the proxy 60 with client devices (not shown in FIG. 2) via the communication link 66. The network-side communication module 64 is used to connect the proxy 60 to an external network (not shown) via the communication link 70. The external network can be, for example, the Internet or Intranet network.

The communication modules 62 and 64 may be any of a variety of available communication means for routing communications using known switching or routing mechanisms. For example, the client-side communication module 62 may be an array of modems for channeling Web page objects to personal computers via conventional telephone lines. The network-side communication module 64 may be a switching circuit for connecting to an external network via a T1 communication link. In one embodiment, the external network is the communications network commonly referred to as Internet or Intranet.

The proxy 60 is able to access or receive Web pages and/or other objects stored in remote servers (not shown) via the communication link 70. The way the proxy 60 receives the objects for caching is done in the same manner as has been described above with reference to FIG. 1. As described above with reference to FIG. 1, a request from the client device 12 is initially satisfied by a response with the object 10 from the remote server 18. The object 10 is also retained in the cache of the proxy server 16 of the local server 14, if desired, so that a future request (either from the same client device 12 or a different client device) for the same object 10 may be satisfied directly from the proxy server 16. The proxy 60 of FIG. 2 is used in a similar manner as the proxy server 16 of FIG. 1 to receive and cache objects received from remote sites via the communication link 70.

As can be seen from FIG. 2, the proxy 60 includes the cache 72 for retaining the objects received in the proxy 60. The objects that are stored may be components of a Web page, such as audio files, HTML files, graphic files, or video files. The objects may also be other files that are transferred via the Internet, such as File Transfer Protocol (FTP) transfers. In accordance with one embodiment of the present invention, the cache 72 is logically partitioned into a number of storage areas 73–73n. Each of the storage areas 73–73n can be of the same size or different sizes. In addition, the size of each of the storage areas 73–73n can be dynamically changed or remain unchanged after the initial partition. Dynamic allocation of sizes allows some storage areas to increase in size by shrinking the size of other storage areas. This approach allows the storage areas that are very busy in caching objects to use more space that is allocated to the other inactive storage areas. This allows the cache 72 to adjust to changes in the workload without requiring human intervention.

In one embodiment, the size of each of the storage areas 73–73n is dynamically assigned and changed. In another embodiment, the size of each of the storage areas 73–73n is set statically and remains unchanged after initial partitioning. Alternatively, the storage areas 73–73n can be initially set at the same size and then dynamically changed during the operation. The storage areas 73–73n can also be initially set at different sizes and then dynamically changed during the operation, or not changed.

Each of the storage areas 73–73n is used to store objects of one kind. For example, the storage area 73 can be used to store objects that have high impact on one performance metric (e.g., hit rate) while the storage area 73a is used to store objects that have high impact on another performance metric (e.g., byte hit rate). The storage area 73n can, for example, be used to store objects that are extremely popular. The objects to be cached in the cache 72 can also be sorted in accordance with other categories. For example, the objects can be distinguished as image objects, video objects, large objects, small objects, or extremely popular objects, etc.

The cache 72 is controlled by the cache manager 74. The cache manager 74 receives the objects to be cached from the communication module 64 and sends the objects to the cache 72. The cache manager 74 also manages the contents stored in the cache 72. This is because some objects are un-cachable, such as secured objects and file forms that are completed by inputs from a user at a client device prior to transfer from a server to the client device. The cache manager 74 has the ability to distinguish cachable objects from non-cachable objects. The cache manager 74 determines which objects are to be stored in which of the storage areas 73–73n. The cache manager 74 also tracks the location of a stored object such that when the object is requested, the cache manager 74 can send the request to the appropriate storage area or can retrieve the requested object from the appropriate storage area. As can be seen from FIG. 3, the cache manager 74 includes a controller 82 and a partition lookup table 81. The partition lookup table 81 tracks which of the storage areas 73–73n stores what kind of objects. The controller 82 accesses the partition lookup table 81 whenever it receives an object to be stored in the cache 72 or a request for a cached object.

A more important role of the cache manager 74 is to determine which objects are to be evicted from the cache 72 when the cache 72 is detected in need of a replacement operation. The cache 72 typically requires a replacement operation when, for example, the capacity of the cache 72 has been exhausted. Thus, when a recently received object is eligible for caching, the cache manager 74 determines which of the previously cached objects is to be evicted from the cache 72. If the cache manager 74 determines that the recently received object is likely to be less "popular" than any of the presently cached objects, the object remains un-cached.

The cache manager 74 controls the eviction of cached objects in the cache 72. Each storage area of the cache 72 is refreshed (i.e., evicting cached objects stored in the cache) in accordance with one of a number of replacement strategies or polices. Each replacement policy is optimized for one performance metric. For example, when the storage area 73 stores objects that have high impact on the hit rate, a replacement policy that is optimized for the hit rate is used for the storage area 73. This allows multiple replacement policies to be simultaneously applied to the cache 72. This also allows the cache 72 to cache objects of different kinds while offering optimized performance across several performance metrics at the same time.

The hit rate and byte hit rate are the two main (or most common) performance metrics used to measure performance of proxy cache such as the cache 72. As described above, the hit rate measures the number of requests satisfied from the proxy cache as a percent of total requests. The byte hit rate measures the number of bytes that the proxy cache served directly as a percent of the total number of bytes for all requests. To get the best hit rate, it is more "profitable" to replace one large object than many small objects. To get the best byte hit rate, larger files must be considered.

There are a number of replacement policies or strategies that can be used for proxy caching. However, each of the policies is optimized for one chosen metric (e.g., hit rate, byte hit rate, or latency) and has its own advantages and disadvantages. For example, a well known replacement policy is the Least-Recently-Used (LRU) algorithm. According to this policy, when an eviction is required in order to store a recently received object, the previously cached object that was requested least recently is evicted. Although this policy is a simple policy that is effective for virtual memory systems, it does not work well if the cached objects are only popular during certain times of a day or certain days of a month.

A second replacement policy is the Least-Frequently-Used (LFU) algorithm that replaces the object which has been accessed the least number of times. This strategy attempts to keep more popular objects and replace rarely used objects. However, some objects can build a high frequency count over a short period of time and be rarely accessed after the subject matter is no longer "hot". Such objects often remain within the cache long after the objects are no longer "hot".

A third replacement policy uses the size of the cached objects as the measurement, which replaces the largest cached object. This strategy tries to minimize the miss ratio by replacing one large object rather than many smaller ones. However, some of the small objects brought into the cache may never be accessed again. The Size strategy does not provide any mechanism to evict such objects, which leads to pollution of the cache. This Size policy has a poor byte hit rate since it discriminates against large-sized objects.

A fourth replacement policy is the Greedy-Dual-Size (GDS) replacement policy. This policy replaces the object with the lowest key value for a certain utility/cost function. When an object i is requested, it is given a priority key $K_i$ which is computed as follows:

$$K_i = C_i/S_i + L$$

where $C_i$ is the cost associated with bringing the object i into the cache. $C_i$ can be determined using a number of different cost functions and corresponding performance metrics. $S_i$ is the object size and L is a running age factor that starts at 0 and is updated for each replaced (evicted) object f to the priority key of this object in the priority queue (i.e., $L=K_f$). The GDS policy outperforms previously known caching strategies with regard to a number of metrics, including cache hit ratio and byte hit ratio. However, the GDS algorithm or policy does have at least one shortcoming, namely, that the algorithm does not take into account how many times the cached object was accessed in the past.

A fifth policy is a LFU-Aging replacement policy that replaces the least frequently used object, avoiding cache pollution. The LFU component of the replacement policy maintains a frequency count for each object in the cache. The aging component of the replacement policy avoids cache pollution by reducing the frequency count of each cached object by a factor of two whenever the average frequency count exceeds a threshold parameter. Since some objects may be extremely popular, they might stay in the cache for longer than desired or have significant influence on the current frequency count. This policy retains popular objects for longer time periods and is able to discriminate against those objects which are only accessed once while in the cache (i.e., extremely unpopular objects).

A sixth policy is a LRU-Log (size) replacement policy that is similar to the LRU replacement policy. The policy replaces the object that has the largest log (size) and is the least recently used object among the same log (size) object. A seventh policy is a Lowest-Latency-First replacement policy that removes the object with the lowest download latency. This policy is designed to minimize average latency. An eighth policy is a Lowest-Relative-Value (LRV) replacement policy that includes the cost and size of an object in the calculation of a value that estimates the utility of keeping an object in cache. This replacement policy evicts the object with the lowest utility value. This policy also achieves high hit rate, but requires significant cache space as it does not consider size at all. This policy also has the ability to age the object set to prevent cache pollution.

A ninth replacement policy is a Greedy-Dual-Size with Frequency (GDSF-Hits) replacement policy. This policy is the improvement of the above described GDS replacement policy. This policy reflects object access patterns by incorporating a frequency count $F_i$ in the computation of $K_i$ such that $$K_i = F_i * C_i / S_i + L$$

When $C_i=1$ for all i, this policy achieves very high hit rates.

A tenth replacement policy is a Least Frequently Used with Dynamic Aging (LFU-DA) replacement policy. The difference between this policy and the LFU-Aging policy described above is that this policy does not require the setting of parameters. This is done by replacing the tuneable aging mechanism of the LFU-Aging policy with a dynamic mechanism (i.e., the inflation factor L) such that the key value $K_i$ for object i is calculated as follows:

$$K_i = F_i * C_i + L$$

When $C_i=1$, this policy achieves similar hit rates and byte hit rates to the LFU-Aging replacement policy. In addition, this dynamic aging mechanism is more efficient computationally than that of the LFU-Aging policy.

Figure 3:
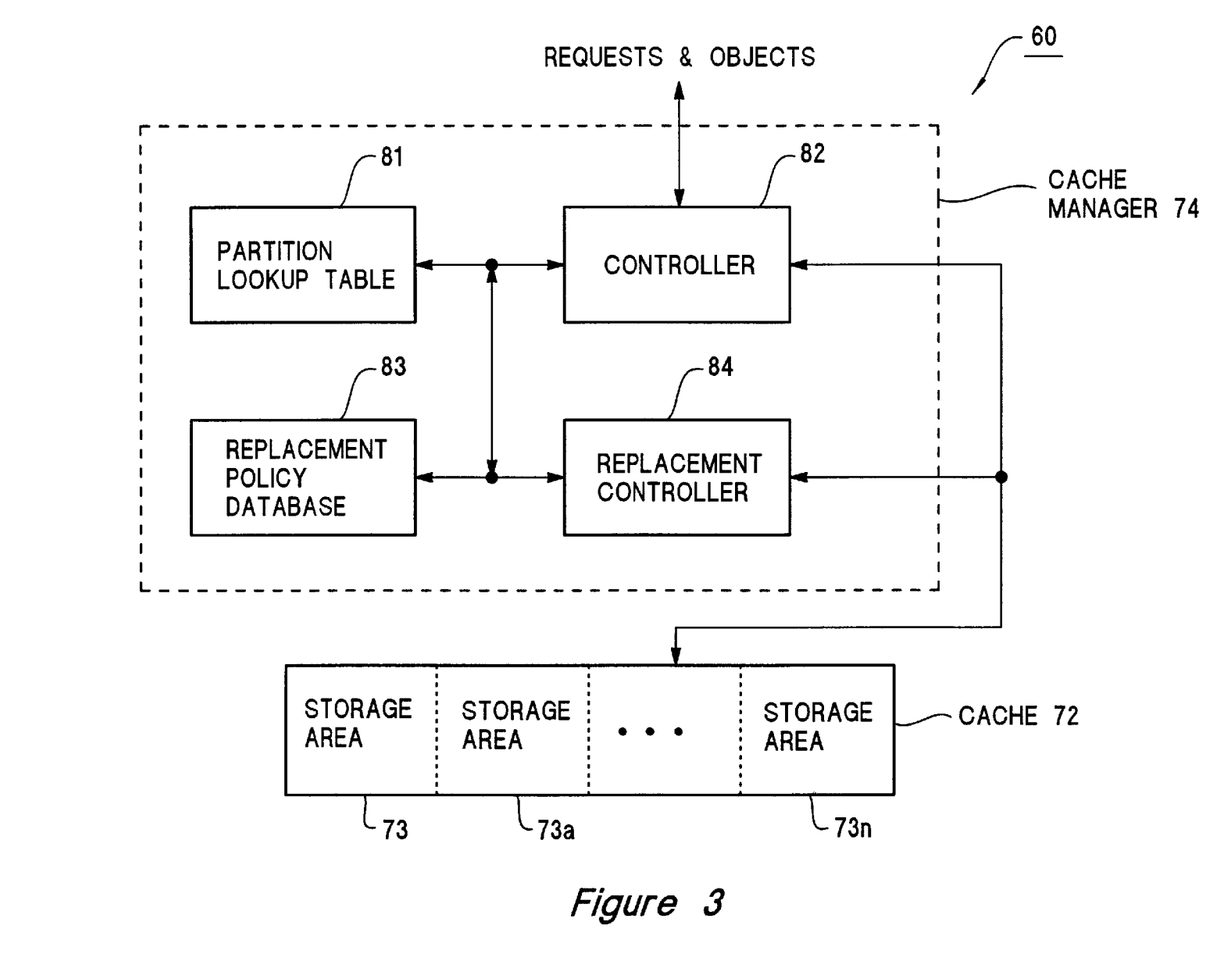
FIG. 3 shows in more detail the structure of the cache manager of the proxy of FIG. 2.

Alternatively, other known cache replacement policies may also be used for the cache 72. All of the replacement policies are stored in a replacement policy database 83 of the cache manager 74 and can be retrieved by a replacement controller 84 of the cache manager 74 to be applied to the appropriate ones of the storage areas 73–73n to replace the cached objects. Each of the components 81–84 of the cache manager 74 can be implemented using known means.

One of the advantages of partitioning the cache 72 into a number of storage areas 73–73n and allowing each storage area to be applied with one replacement policy is that different performance metrics can be achieved simultaneously on a single cache 72. Another advantage of partitioning is that the scheme works well in the situation of non-uniform distribution. For example, some objects are extremely popular and account for a large fraction of all requests (and potential cache hits). Caching just these few objects results in great improvements in performance. However, once these extremely popular objects have all been cached, it becomes increasingly difficult to identify objects that will have a significant impact on performance and thus large increases in cache space are required to further improve the performance of the cache. In addition, the number of the popular objects may also vary from time to time. Through the use of partitioning, the cache 72 is able to cache this set of extremely popular objects with dynamic size, thus achieving most of the performance of a larger cache and still having cache space remaining to store objects that have more impact on a different performance metric. Another advantage of partitioning is the different reference patterns between request streams. For example, the reference patterns for image objects are quite different from the reference patterns for video objects. This means that partitioning protects image objects from being replaced from the storage area where the video objects are added.

Figure 4:
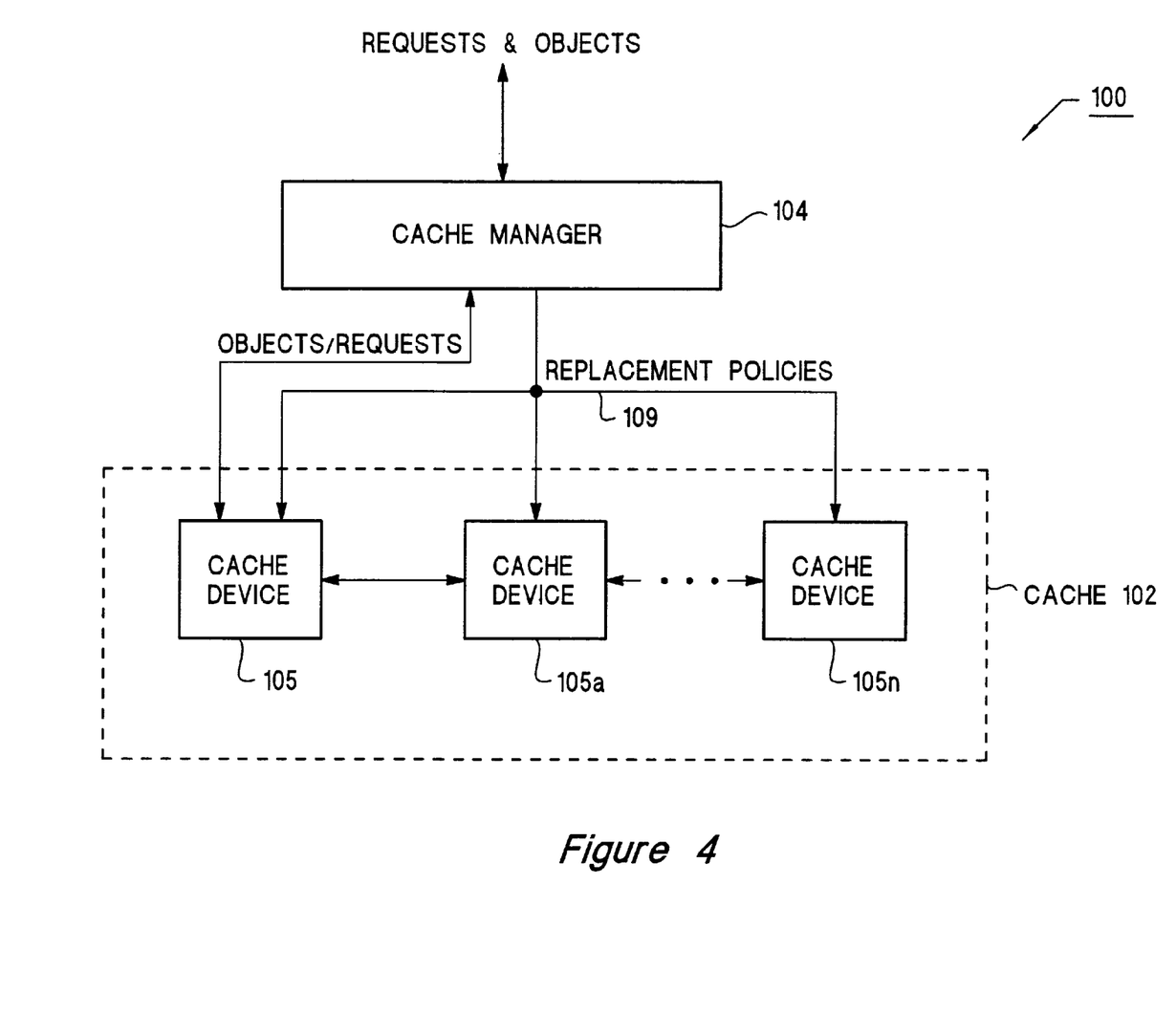
FIG. 4 shows the structure of another proxy in accordance with another embodiment of the present invention.

FIG. 4 shows another cache proxy 100 in accordance with another embodiment of the present invention. As can be seen from FIG. 4, the cache 102 is comprised of a number of storage or cache devices 105–105n connected together. Alternatively, the cache 102 is only logically partitioned into a number of storage areas. Each of the cache devices (or partitioned storage areas) 105–105n stores objects of one kind. The cache device 105 is connected to a cache manager 104. The cache manager 104 sends all objects for caching in the cache 102 to the cache device 105. In addition, the cache manager 104 sends all requests for cached objects to the cache device 105.

Upon receiving an object for caching from the cache manager 104, the cache device 105 determines whether the received object is to be stored in the cache device 105 or not. If the cache device 105 is not full, no replacement is needed and the object is stored in the cache device 105. If the cache device is full, replacement is needed and the cache device 105 determines which object is to be sent to the next cache device 105a based on its replacement policy. The replaced objects form the object input stream for the next cache device 105a.

When the cache device 105a receives a replaced object from the cache device 105, it also determines if replacement is needed to cache the replaced object in accordance with its replacement policy. As described above, the two devices 105 and 105a may employ entirely different policies for their replacement operations. If replacement is needed, the cache device 105a then keeps those objects that will help the device perform well based on its replacement policy. The replaced object is then sent to the next cache device. The process continues until no replacement operation is needed in one of the cache devices 105–105n, or until the last one of the cache device 105n is reached. Replacement from the last cache device 105n is removed from the cache 102. Throughout the process, the cache manager 104 is fully aware of which object is stored in which of the cache devices 105–105n.

When an object is again accessed (i.e., on a cache hit), the object may be moved back up the chain (e.g., to the preceding cache device, to the initial cache device, or to some cache device ahead in the chain). This allows the popular objects to stay in the cache 102 longer while unpopular objects move to the end of the chain quickly and are removed from the cache 102.

When the cache manager 104 receives a request for a cached object in one of the cache devices 105–105n of the cache 102, the cache manager 104 can send the request to the cache device 105, regardless whether the requested object is cached in the cache device 105 or not. If the object is stored in the cache device 105, the object is fed back to the cache manager 104. If not, the cache device 105 retrieves the object from the subsequent one of the cache devices 105–105n where the object is stored. The object is then sent to the cache manager 104 from the cache device 105. Alternatively, the cache manager 104 sends the request to the cache device that stores the requested object directly.

Each of the cache devices 105–105n is refreshed in accordance with one of a number of replacement policies. Each of the cache devices 105–105n receives its respective replacement policy from the cache manager 104 via the bus 109. Each of the cache devices 105–105n then conducts its own replacement operation in accordance with the replacement policy received.

Figure 5:
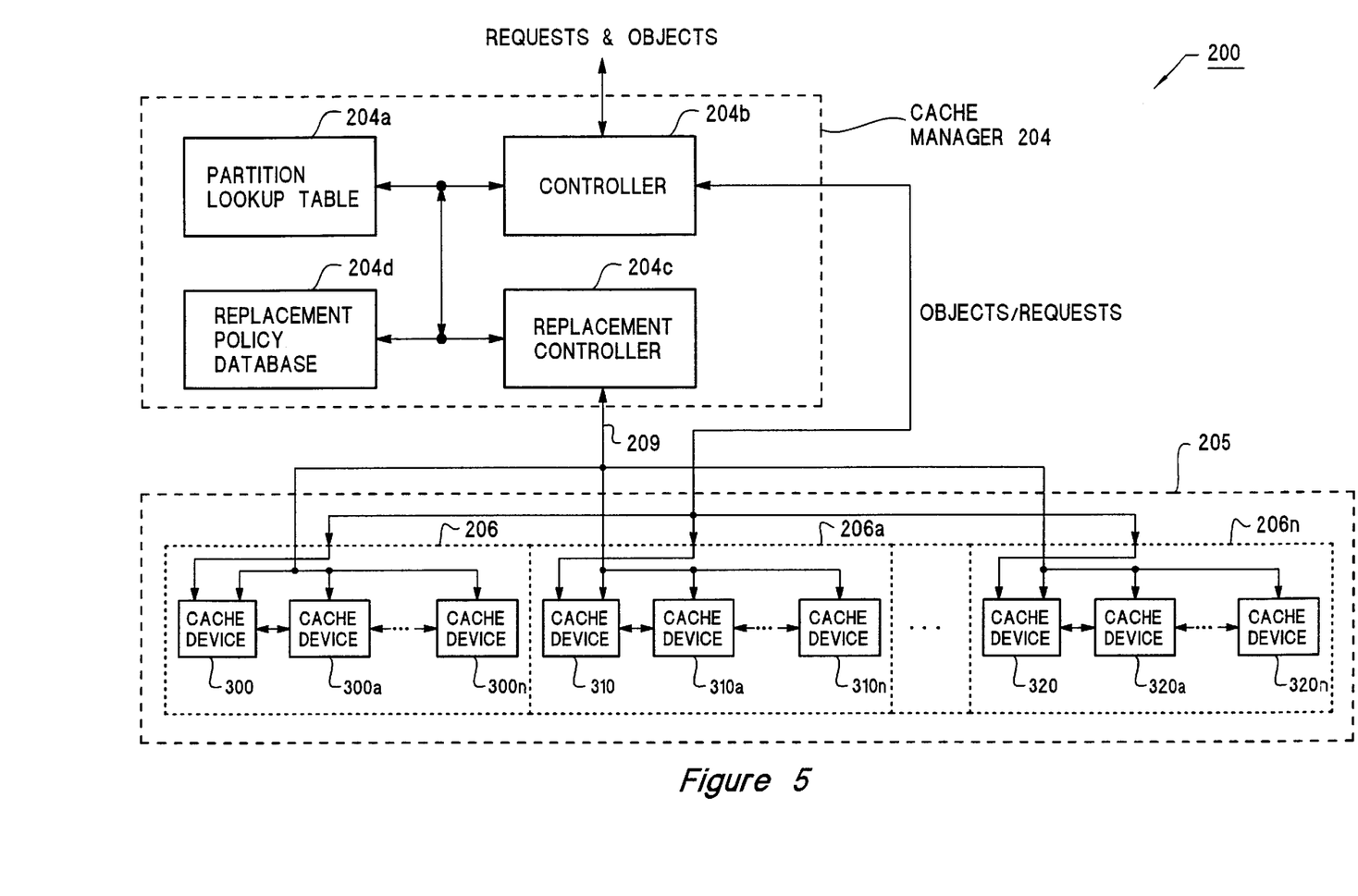
FIG. 5 shows the structure of yet another proxy in accordance with a further embodiment of the present invention.

FIG. 5 shows another cache proxy 200 in accordance with another embodiment of the present invention. As can be seen from FIG. 5, the cache 205 is structured such that it encompasses the characteristics of the cache 72 of FIGS. 2–3 and the cache 102 of FIG. 4. As can be seen from FIG. 5, the cache 205 is partitioned into a number of storage areas 206–206n, each being comprised of a number of storage or cache devices. For example, the storage area 206 includes a number of cache devices 300 through 300n connected together and the storage area 206n includes a number of cache devices 320–320n connected together. Each of the cache devices in each of the storage areas 206–206n stores objects of one kind. The first cache device in each of the storage areas 206–206n is connected to a cache manager 204. The cache manager 204 sends all objects for caching in the storage area 206 to its first cache device 300. Similarly, the cache manager 204 sends all objects for caching in the storage area 206a to its first cache device 310.

Upon receiving an object for caching from the cache manager 204, the first cache device in each of the storage areas 206–206n determines whether the received object is to be stored in the first cache device or not. For example, the cache device 300 of the storage area 206 determines if the object received from the cache manager 204 to the storage area 206 is to be stored in the cache device 300. If so, the cache device 300 stores the object. If not, the cache device 300 sends the object to the next cache device 301. The cache device 301 then determines if the object is to be stored in the cache device 301 or not. The process continues until the object is finally stored in the appropriate one of the cache devices 300–300n. This caching and replacement process is the same as the process described above in connection with FIG. 4, which will not be described in more detail below.

When the cache manager 204 receives a request for a cached object in the cache 205, the cache manager 204 first determines which of the storage areas 206–206n the request should be sent to. For example, if the cache manager 204 determines that the request should be sent to the storage area 206, the cache manager 204 can send the request to the cache device 300 of the storage area 206, regardless whether the requested object is cached in the cache device 300 or not. If the object is stored in the cache device 300, the object is fed back to the cache manager 204. If not, the cache device 300 retrieves the object from the subsequent one of the cache devices 300–300n where the object is stored. The object is then sent to the cache manager 204 from the cache device 200. Alternatively, the cache manager 104 sends the request to the cache device that stores the requested object directly.

Each cache device in each of the storage areas 206–206n is refreshed in accordance with one of a number of replacement policies. Each cache device receives its respective replacement policy from the cache manager 204 via the bus 209. Each cache device in each of the storage areas 206–206n then conducts its own replacement operation in accordance with the replacement policy received.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A cache system comprising:
    a storage that is partitioned into a plurality of storage areas, each for storing one kind of objects of different sizes received from remote sites and to be directed to target devices;
    a cache manager coupled to the storage to cause objects to be stored in the corresponding areas of the storage, wherein the cache manager causes cached objects in each of the storage areas to be replaced in accordance with one of a plurality of replacement policies, each policy being optimized for one kind of objects and being different from one another such that the storage can store objects of different kinds while offering optimized performance across different performance metrics at the same time, wherein the cache manager may cause more than one cached object in a storage area to be evicted in order for a single new object to be stored in the same storage area.

2. The cache system of claim 1, wherein when the cache manager receives an object from remote sites, the cache manager determines to which one of the storage areas the received object is to be cached based on which kind the object belongs to.

3. The cache system of claim 1, wherein the cache manager dynamically changes the size of each of the storage areas of the storage.

4. The cache system of claim 1, wherein the cache manager statically partitions the storage areas such that the size of each of the storage areas remains unchanged after partitioning.

5. The cache system of claim 1, wherein the cache manager further comprises:
    a partition lookup table that indicates which kind of objects are stored in which of the storage areas;
    a replacement policy database that stores the plurality of replacement policies;
    a replacement controller that applies one of the replacement policies to a corresponding one of the storage areas.

6. The cache system of claim 1, wherein the plurality of replacement policies are selected from a group comprising a Least-Recently-Used (LRU) replacement policy, a Least-Frequently-Used (LFU) replacement policy, a Greedy-Dual-Size (GDS) replacement policy, a LFU-Aging replacement policy, a LRU-Log (size) replacement policy, a Size replacement policy, a Lowest-Latency-First replacement policy, a Lowest-Relative-Value (LRV) replacement policy, a GDS-Frequency replacement policy, and a LFU-Dynamic Aging replacement policy.

7. A cache system, comprising:
    (A) a storage that includes a first and a second storage device coupled together, wherein each of the first and second storage devices stores objects of different sizes received from remote sites and to be directed to target devices;
    (B) a cache manager coupled to the first storage device to send received objects to the first storage device, wherein the cache manager causes cached objects in the first storage device to be replaced in accordance with a first replacement policy, wherein the replaced objects are sent to the second storage device, wherein the cache manager causes cached objects in the second storage device to be replaced in accordance with a second replacement policy different from the first replacement policy such that the storage can store objects of different kinds while offering optimized performance across different performance metrics at the same time, wherein the cache manager may cause more than one cached object in one of the first and second storage devices to be evicted in order for a single new object to be stored in the same storage device.

8. The cache system of claim 7, further comprising a third storage device coupled to the second storage device to store objects replaced from the second storage device, wherein the cache manager replaces the objects stored in the third storage device in accordance with a third replacement policy different from the first and second replacement policies.

9. The cache system of claim 8, wherein when the first storage device receives an object for caching and the first storage device is full, the first storage device passes a replaced object to the second storage device in accordance with the first replacement policy.

10. The cache system of claim 9, wherein when the second storage device receives the replaced object for caching and the second storage device is full, the second storage device passes a second replaced object to the third storage device in accordance with the second replacement policy.

11. The cache system of claim 10, wherein when the third storage device receives the replaced second object for caching from the second storage device and the third storage device is full, the third storage device evicts a third replaced object in accordance with the third replacement policy.

12. The cache system of claim 11, wherein when a cached object in the third storage device is requested by an access request in a cache hit operation, the object is moved back to the first storage device.

13. The cache system of claim 8, wherein each of the first, second, and third replacement policies is selected from a group comprising a Least-Recently-Used (LRU) replacement policy, a Least-Frequently-Used (LFU) replacement policy, a Greedy-Dual-Size (GDS) replacement policy, a LFU-Aging replacement policy, a LRU-Log (size) replacement policy, a Size replacement policy, a Lowest-Latency-First replacement policy, a Lowest-Relative-Value (LRV) replacement policy, a GDS-Frequency replacement policy, and a LFU-Dynamic Aging replacement policy.

14. A cache system, comprising:
   (A) a storage that is partitioned into a first and a second storage area, each including a first and a second storage device coupled together;
   (B) a cache manager coupled to the first storage device of each of the storage areas to cause objects to be stored in the corresponding areas of the storage, wherein the cache manager causes cached objects in the first storage device of the first storage area to be replaced in accordance with a first replacement policy, wherein the replaced objects are then sent to the second storage device of the first storage area and the cache manager causes the cached objects stored in the second storage device of the first storage area to be replaced in accordance with a second replacement policy different from the first replacement policy, wherein the cache manager causes cached objects in the first storage device of the second storage area to be replaced in accordance with a third replacement policy different from the first replacement policy, wherein the replaced objects are then sent to the second storage device of the second storage area and the cache manager causes the cached objects stored in the second storage device of the second storage area to be replaced in accordance with a fourth replacement policy different from the third replacement policy.

15. The cache system of claim 14, wherein the cache manager further comprises:
   a partition lookup table that indicates which object is stored in which of the storage areas;
   a replacement policy database that stores the replacement policies;
   a replacement controller that applies the corresponding one of the replacement policies to a corresponding one of the storage devices of the corresponding storage area.

16. The cache system of claim 14, wherein each of the first and second storage areas further comprises a third storage device coupled to the second storage device to store objects replaced from the second storage device, wherein the cache manager replaces objects stored in the third storage device in accordance with a fifth replacement policy.

17. The cache system of claim 14, wherein the storage further comprises a third storage area including a plurality of storage devices coupled together.

18. The cache system of claim 14, wherein the replacement policies are selected from a group comprising a Least-Recently-Used (LRU) replacement policy, a Least-Frequently-Used (LFU) replacement policy, a Greedy-Dual-Size (GDS) replacement policy, a LFU-Aging replacement policy, a LRU-Log (size) replacement policy, a Size replacement policy, a Lowest-Latency-First replacement policy, a Lowest-Relative-Value (LRV) replacement policy, a GDS-Frequency replacement policy, and a LFU-Dynamic Aging replacement policy.

19. The cache system of claim 14, wherein when the first storage device of one of the first and second storage areas receives an object for caching and the first storage device is full, the first storage device passes a replaced object to the second storage device in accordance with one of the first and the third replacement policies.

20. The cache system of claim 19, wherein when the second storage device of one of the first and second storage areas receives the replaced object for caching and the second storage device is full, the second storage device determines a second replaced object in accordance with one of the second and fourth replacement policies.

21. The cache system of claim 20, wherein when a cached object in the second storage device of one of the first and second storage areas is requested by an access request in a cache hit operation, the object is moved back to the corresponding first storage device.

* * * * *